Figure 1:
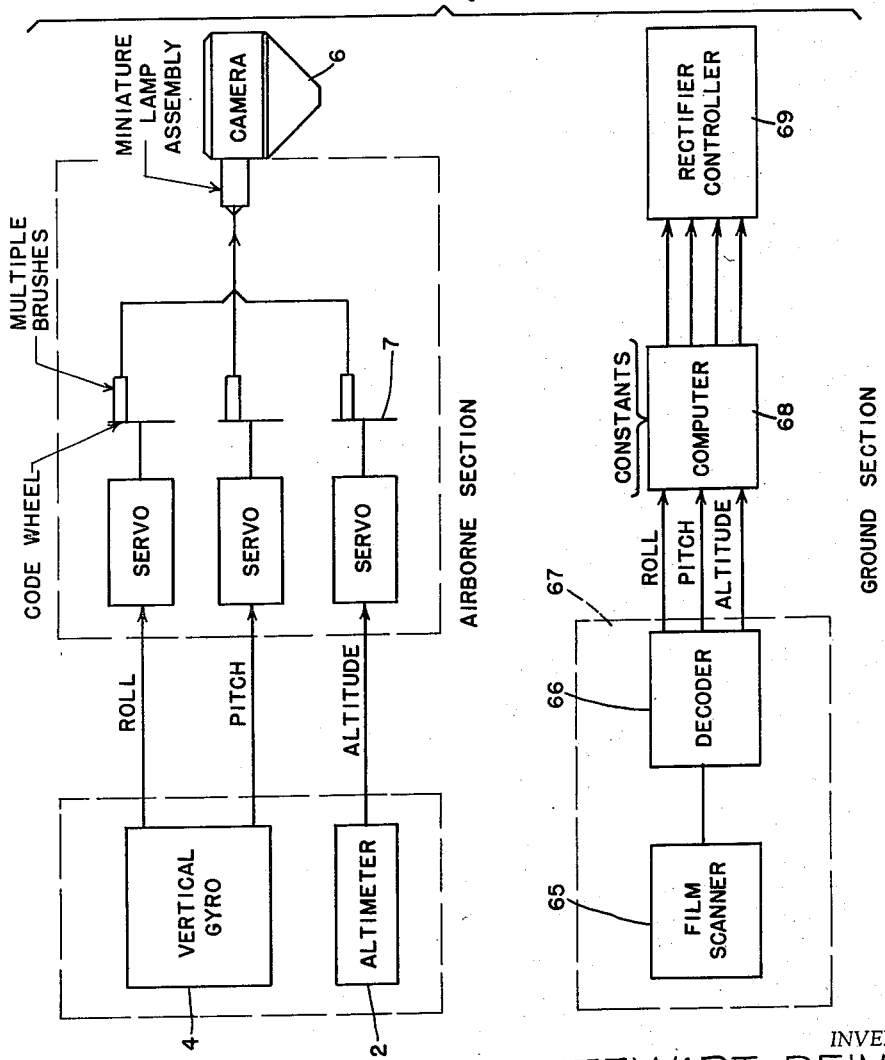

June 24, 1958  S. REINER ET AL  2,839,974
AUTOMATIC RECTIFICATION SYSTEM
Filed Jan. 8, 1954  3 Sheets-Sheet 1

INVENTOR
STEWART REINER
SOL DOMESHEK
BY
ATTORNEYS

INVENTOR
STEWART REINER
SOL DOMESHEK

2,839,974

AUTOMATIC RECTIFICATION SYSTEM

Stewart Reiner, New Rochelle, and Sol Domeshek, Great Neck, N. Y., assignors, by direct and mesne assignments, to the United States of America as represented by the Secretary of the Navy Application January 8, 1954, Serial No. 403,085

10 Claims. (Cl. 95—12.5)

This invention relates in general to aerial cameras and has particular reference to the automatic determination and recording of the various angles of tilt of the aerial camera and the utilization of said information to rectify and correct the finished print to the desired scale.

In aerial photography the camera is rigidly connected to the aircraft frame. In many instances, specifically in military use, it is of paramount importance to photograph military installations, production centers, harbors, troop concentrations, cities and land areas. The specified areas are generally located well within enemy territory and are heavily fortified and protected by anti-aircraft guns and fighter intercepter airplanes. Under optimum conditions, the film of the aerial camera is, at all times, parallel to the ground and located at a constant predetermined height or altitude above the area being photographed. Under said optimum conditions the final print need only be corrected to the required or desired scale, requiring no rectification.

Unfortunately, however, it is almost impossible to photograph areas that are located within enemy territory under said optimum conditions of absolutely level flight at a fixed predetermined altitude. The said optimum conditions mentioned can not be obtained because of the vast number of variables affecting such conditions. A few physical conditions that affect level flight conditions are as follows: Air pockets that affect, radically, the altitude of the airframe and introduce tilt angles to the camera due to the roll and pitch of the airplane; evasive maneuvers that are necessary to avoid anti-aircraft fire and pursuing enemy interceptor airplanes; shock waves due to exploding anti-aircraft shells and the skill and ability of the pilot in the control and operation of the aircraft. Said movement and evasive maneuvers of the airplane, if not violent, are almost always present in a mild form.

Photographs that are taken under any one or a combination of said conditions must be rectified to obtain a true projection and accurate information and must also be corrected as to scale so that a composite picture of the desired area can be assembled, from the various photographs, into one photograph. At the present time it is extremely difficult to rectify a photograph and correct said photograph to the desired scale. This difficult condition exists because neither the various angles of roll and pitch of the aircraft frame, which are transmitted directly to the camera as a result of the rigid connection between said airframe and camera, nor the exact altitude of the camera are known at each instant of film exposure. Another difficulty is that when an enemy area is to be photographed, there are no previously corrected photographs of the area that can be used as a reference or guide in rectifying and correcting the finished photograph to the proper scale. At the present time a photograph that is taken from an airplane has no information relating to the tilt angles or the altitude of the camera at the instant of exposure. Therefore, the process or procedure of present day rectification and scale correction of the finished print is accomplished by one of a variety of methods. These methods include, photographing the position of the sun and the time at the instant that the terrain below is photographed; photographing the horizons and, photographing the instrument panel of the airplane.

The first mentioned method requires voluminous computations and a clear day. The second mentioned method also requires excellent visibility. The first two methods can not be utilized when the sky is overcast or when photographs are taken in the nighttime with the aid of infra red film.

The third mentioned method is very inaccurate in the determination of the angular position of the camera platform because the airplane instruments give qualitative and not quantitive readings. The pilot of an airplane is not interested in the exact altitude of the airplane and it is of very little concern to him whether the airplane is banked at an angle of three degrees of three and one half degrees. This last mentioned method of determining the position of the camera platform, at the instant of exposure, can result in errors that are of the magnitude of five degrees when the weather is rough.

From the above mentioned facts it can readily be determined that the present day methods are extremely inefficient, time consuming, costly and susceptible to numerous serious errors. The present invention will reduce all errors to an absolute minimum. The invention will deliver within a very short interval of time a rectified photograph that is corrected to the desired scale and relatively free of errors.

In the invention a discrete code that represents the various values of roll, pitch and altitude of the aerial camera is placed, automatically, on each frame at the instant of exposure. The code is in the form of light and dark areas. After the negative is developed, it is placed in a device that automatically scans the code. This coded information is then inserted into a computer that solves the required equations and indicates, on a plurality of dials, the various settings for a Bausch and Lomb Autofocus Photographic Rectifier. The rectifier is then set in accordance with the computer dial readings and the final print is made. Thus, the final print will appear as if the camera were absolutely parallel to the ground when the photographs were taken. The final print is also corrected to the desired scale so that a composite picture of the complete area photographed can be assembled, read and interpreted with accuracy, ease and speed.

It is an object of the present invention to provide a means of automatically inserting values of roll, pitch and altitude, of an aerial camera, in a coded form, on each frame of film at the time of exposure.

Another object is to convert the coded values of roll, pitch and altitude into actual values to produce a photograph that is rectified to the horizontal plane and corrected as to scale.

A general object of the invention is to provide a device capable of rectifying or correcting for the angular displacement of the camera at the time the photograph is taken.

It is also an object to correct the final print automatically to the proper scale.

A further object is to provide a means that will allow an airplane to engage in evasive maneuvers and still be capable of accurately indicating the deviation of the camera from a plane that is parallel to the ground.

An additional object is to automatically record on each frame of the film the angles of roll and pitch and the altitude of the camera at the instant of exposure.

It is another object to install and operate the heavy, bulky, expensive portions of the device on the ground while the more compact, more economical and lighter portion of the device is located in the airplane.

Another object is to have that portion of the device that is located within the airplane almost completely automatic in its operation and to require a minimum amount of concentration and attention on the part of the operator.

An additional object of the invention is to record the altitude and the angular deviations of the camera, at the instant of exposure, regardless of the weather conditions or the time of day.

Figure 2A:
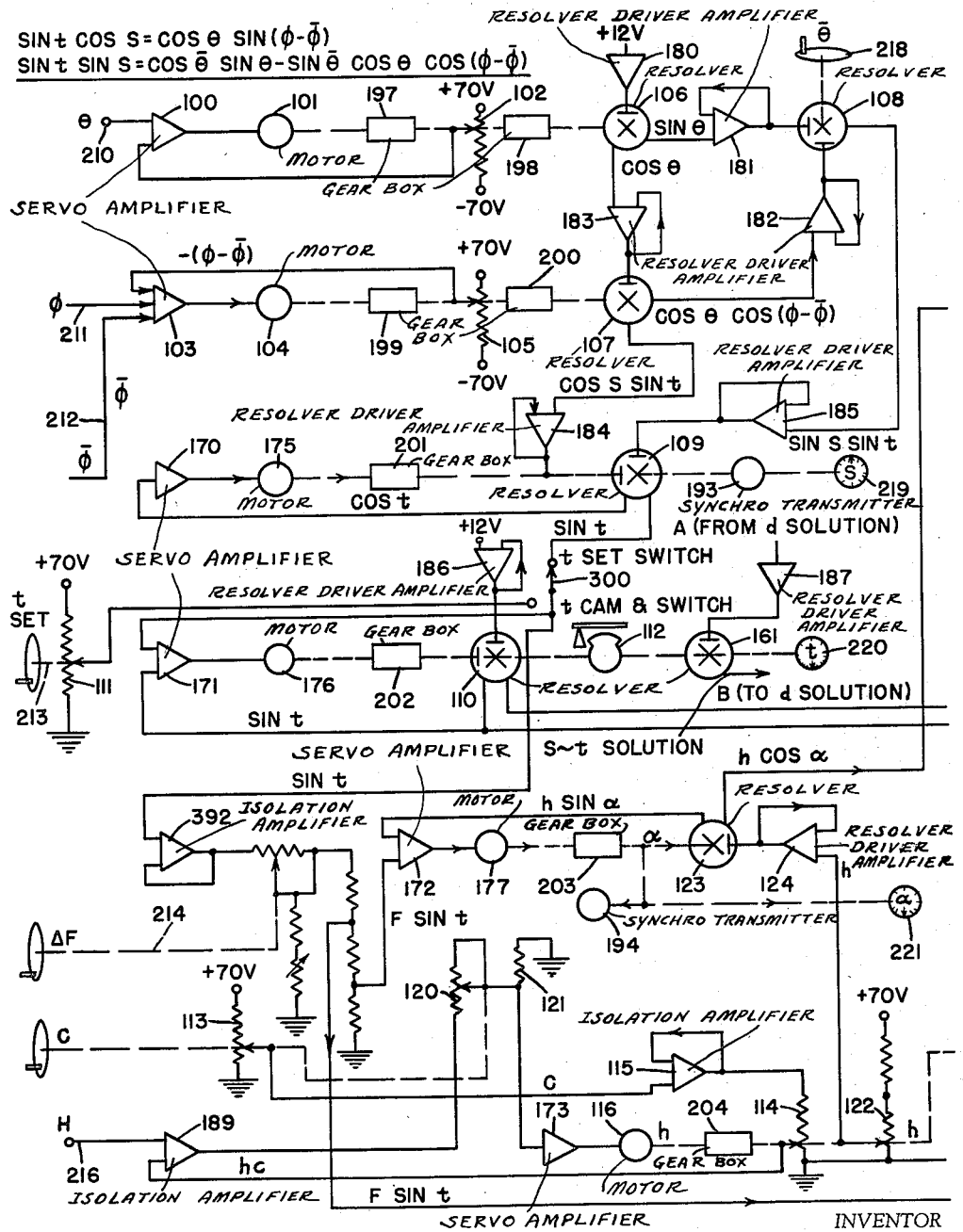
Figure 2B:
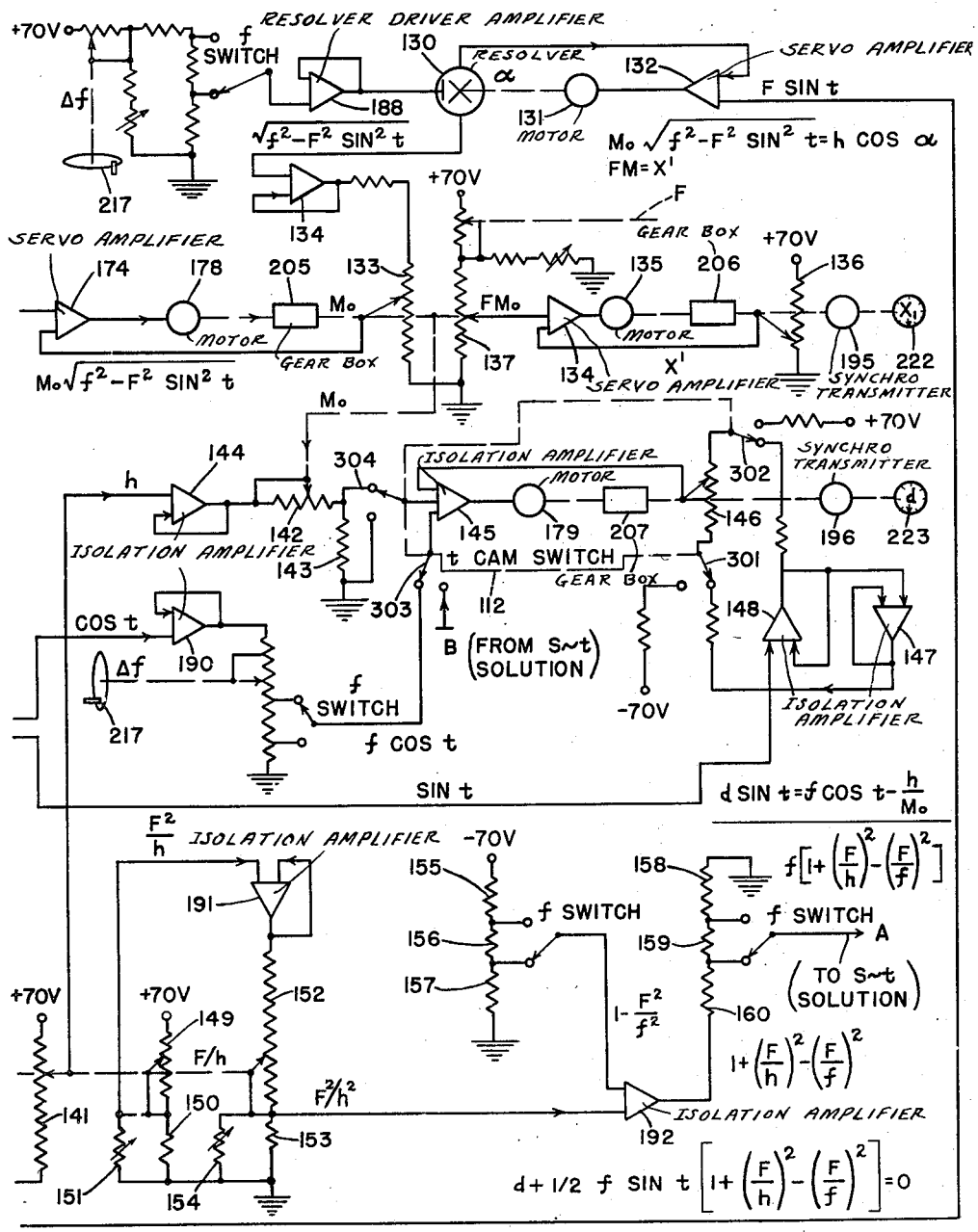

Other objects and many of the attendant advantages of this invention will be readily appreciated as the same becomes better understood by reference to the following detailed description when considered in connection with the accompanying drawings wherein:

Fig. 1 is a block diagram of the overall invention, showing both the airborne section and the ground section of the apparatus, and Figs. 2A and 2B together form a schematic diagram of the rectifier computer.

Referring to Fig. 1 an altimeter 2 and a vertical gyro 4 operate as end instruments to measure the roll, pitch and altitude of the camera 6 at each instant of exposure. The altimeter 2 is connected to rotate the code wheel 7 through a servo system and a gear train. The code wheel 7 consists of conducting and non-conducting segments that make contact with a plurality of brushes. The code wheel is divided into a number of sectors where each sector represents a number.

The conducting and non-conducting portions of each sector of the code wheel form a pattern that is determined by some discrete code such as the Bell Telephone Gray code or the digital code. Thus, each sector contains its own unique pattern. The differential between the maximum and minimum limits of the altitude is divided into an equal number of parts and each part is assigned a number. The greater the accuracy required, the larger the number of increments of altitude. Each brush that makes contact with the code wheel is connected to an individual miniature lamp that is located within the camera 6. Therefore, for each position of the code wheel, a particular pattern of illuminated lamps will be generated. In the present invention the angular position of the code wheel is controlled by the altimeter, therefore each specific pattern that is generated by the lamps will represent a particular altitude.

The lamps are placed so that the pattern of on and off lamps can be recorded on a photographic film. A make-break contact, that is not shown, is also provided so that the lamps will only generate the coded pattern at each instant of the film exposure.

The roll and pitch of the camera is recorded in the same manner on the other two code wheels. However, a vertical gyro 4 is utilized instead of an altimeter. These three code wheels combine to transpose the measured values of roll, pitch and altitude into a discrete code which is recorded on the camera film. An orientation indicating means such as a resolver or variable resistor is mounted on the gimbal rings of the gyro. The deviation of the gimbal rings controls the angular rotation of the roll and pitch code wheel through a servo means and a gear train. The operation of the roll and pitch recording means are similar to the recording means that is utilized to record the altitude and, therefore, will not be discussed.

For a more complete description of a recording means and code wheel of the preferred type, reference is made to the patent application of Stewart Reiner for a Code Wheel Shaft Position Encoder, Recorder and Decoder, Serial No. 376,769, filed Aug. 26, 1953.

In order to provide for greater accuracy in the system, the gyro 4 is periodically reset by an erection type amplifier which supplies correction torque to the gyro in response to gyro pendulum signals. Such amplifiers are well known in the art, so none is specifically disclosed in this application.

Referring to Fig. 1, therein is also shown a block diagram of the ground section of this invention. The film reader 67 consists of a film scanner 65 and a decoder 66. The film scanner consists of a plurality of light sensitive Cetron lead sulfide cells. Said cells have photo-conductive characteristics that cause their resistance to decrease when illuminated. A variable resistance is connected in series with each of said Cetron cells. Said variable resistor is set to equal the resistance of the Cetron cell. The control grid of a thyratron is connected to the junction of the variable resistor and the Cetron cell so that said control grid sees the voltage across the variable resistance. The initially applied voltage that appears across the control grid of the thyratron is of such value that said thyratron will be non-conducting when the Cetron cell is not illuminated. When the Cetron cell is illuminated, its resistance will decrease thus causing the thyratron to fire. The tube continues to conduct until the illumination is removed from the Cetron cell. Each digit requires a Cetron cell and a thyratron tube.

The decoder 66 consists of a plurality of double-pole double-throw relays and a plurality of resistors. The coil of a double-pole, double-throw relay is placed in the plate circuit of the thyratron tube. Said relays convert the gray code to the binary code through the interaction of the contacts. The output of each relay is utilized to actuate the coil of a second set of double-pole, double-throw relays. Said second set of relays converts the digital code into a voltage. The two armature contacts of each of said second set of relays are connected together so as to act as a jumper. Two identical precision resistors are connected to the corresponding contact terminals of each relay. Each resistor is proportional to a digit of the code. Said resistances are connected in series. One end of the series resistances is connected to ground or to any desired voltage; the other end is connected to a high voltage. The point joining the two sets of identical series resistances is considered the output. When the relays of said second set are in their normal positions, one set of the series resistances is shorted out of the circuit so that the output voltage is zero.

When the Cetron cells are illuminated, the binary outputs of the first set of relays will excite the corresponding relays of the second set. Accordingly, the appropriate resistances will be unshorted from that group of shorted series resistances and shorted out of the open set of series resistances. Therefore the output voltage will be directly proportional to the digit output of the first set of relays and the load impedance will remain constant irrespective of the channel information.

Across each coil of the second set of relays a neon tube is connected. Each tube corresponds to a digit of the binary code. Said tubes will be ignited when the corresponding coils are excited. Thus, said neon tubes will give a visual presentation of the binary code output.

For a more complete disclosure of a method and device to scan and decode coded information that is on a photographic film reference is made to the patent application of Marcus Lewinstein et al., for a Decoder for Automatic Photorectification System, filed March 30, 1954, Serial Number 419,939.

The computer 68 is shown schematically in Figs. 2A and 2B. Said computer must solve the following equations:

(1) $$\sin t \cos s = \cos \theta \sin (\phi - \bar{\phi})$$

(2) $$\sin t \sin s = \cos \bar{\theta} \sin \theta - \sin \bar{\theta} \cos \theta \cos (\phi - \bar{\phi})$$

(3) $$h = \frac{H}{C}$$

(4) $$F \sin t = h \sin \alpha$$

(5) $$Mo\sqrt{f^2 - F^2 \sin^2 t} = h \cos$$

(6) $$FMo = x'$$

(7) $$d \sin t - f \cos t + \frac{h}{Mo} = 0$$

(8) $$d \cong -\frac{1}{2} f \sin t \left[1 + \left(\frac{F}{h}\right)^2 - \left(\frac{F}{f}\right)^2\right]$$

For small $t$ where S, $\alpha$, X' and $d$ are to be considered outputs, $\theta$, $\bar{\theta}$, $\phi$, $\bar{\phi}$, H, C, F and $f$ are the inputs and $h$, Mo and $t$ are parameters.

The inputs H, $\theta$, and $\phi$ arrive at the computer as amplitude modulated 400 cycle signals, $\bar{\theta}$, $\bar{\phi}$, C, F and $f$ are inserted by hand for any one flight. The outputs are displayed on dials and are generated as 400 cycle synchro signals.

The definition, symbols and range of variables in the rectifier computer are as follows:

| Quantity | Symbol | Input Range | Output Range |
|---|---|---|---|
| Roll | $\theta$ | −30° to +30° | |
| Pitch | $\phi$ | −30° to +30° | |
| Roll Orientation (Initial) | $\bar{\theta}$ | 0° to 360° | |
| Pitch Orientation (Initial) | $\bar{\phi}$ | −45° to 45° | |
| Altitude | H | 5,000' to 40,000' | |
| Scale Factor | C | 1,433 to 133,000 | |
| Rectifier focal length | F | 5.40" to 5.60" | |
| Camera focal length | $f$ | 5.80" to 6.20" or 11.6" to 12.40" | |
| Principle Distance | $h = H/c$ | .3' to 3.5' | .3' to 3.5'. Variable. |
| Tilt | $t$ | | 0° to 360°. |
| Swing | S | | −5° to 36°. |
| Lens Tilt | $\alpha$ | | .5 to 4.0. |
| Magnification | Mo | | −90 mm. +90 mm. |
| Lateral Displacement | $d$ | | 2.70" to 22.4". |
| Product of F Mo | X' | | |

The S-$t$ equations are trigometric and the method of solution is to generate, by means of resolvers, the functions on the right hand side of Equations 1 and 2 and from them derive S and $t$ by the utilization of resolver servos. For the solution of S and $t$, the inputs $\theta$, $\bar{\theta}$, $\phi$ and $\bar{\phi}$ are required. To generate the sine or cosine of any angle with a resolver the shaft must turn through that angle. Therefore it is essential that $\theta$ and $\phi - \bar{\phi}$ be converted into shaft rotations.

In Figs. 2A and 2B, 100, 103, 132, 134, 170, 171, 172, 173 and 174 are servo amplifiers; 101, 104, 116, 131, 135, 175, 176, 177, 178, and 179 are motors; 124, 180, 181, 182, 183, 184, 185, 186, 187, and 188 are resolver driver amplifiers; 115, 144, 145, 147, 148, 189, 190, 191, 192 and 392 are isolation amplifiers; 106, 107, 108, 109, 110, 123, 130, and 161 are resolvers; 193, 194, 195, and 196 are synchro transmitters; 197, 198, 199, 200, 201, 202, 203, 204, 205, 206, and 207 are gear boxes. The inputs to the computer are $\theta$ (roll) 210, $\phi$ (pitch) 211, $\bar{\phi}$ (pitch orientation) 212, $t$ (tilt set) 213, $\Delta$F (rectifier focal length) 214, C (scale factor) 215, H (altitude) 216, $\Delta f$ (camera focal length variation from mean) 217, and $\bar{\theta}$ (pitch orientation) 218. The outputs or results S 219, $t$ 220, $\alpha$ 221, X 222, and $d$ 223 appear in the form of dial readings.

The design and construction of the various amplifiers are not shown nor described in detail as such is well known in the art. The servo consisting of the amplifier 100, the motor 101 and the resistor 102 converts the electrical angle $\theta$ into a mechanical movement. This is also done for $\phi - \bar{\phi}$ by the servo consisting of servo amplifier 103, motor 104 and resistor 105. In this case $\phi$ and $\bar{\phi}$ are summed along with the return from the resistor 105. The usual type of resistive summing networks can be utilized. In each of the above servo systems an error in the output quantity is proportional to the servo error, the servo loop gain is independent of any of the variables.

Resolver 106 is rotated through the angle $\theta$ by the motor 101 through the gear boxes 197 and 198 and generates rotor output voltages of sin $\theta$ and cos $\theta$. The stator voltage of said resolver is constant and is determined by the type of resolver that is used and, also, by the scale of the computer. One stator of the resolver 107 that is oriented by the servo system comprising the motor 104 is excited by the voltage cos $\theta$ as generated by the resolver 106 and transmitted through resolver driver amplifier 183 and its rotor revolved through $\phi - \bar{\phi}$, thus generating the voltages cos $\theta$, cos $(\phi - \bar{\phi})$ and cos $\theta$ sin $(\phi - \bar{\phi})$ as the rotor outputs.

The rotor of resolver 108 is turned through the angle $\theta$ by the hand wheel 218. One stator of said resolver 108 is excited by the voltage sin $\theta$ as generated by the resolver 106 through the resolver driver amplifier 181, and the other by the voltage cos $\theta$ cos $(\phi - \bar{\phi})$ as generated by the resolver 107, through the resolver driver amplifier 182. The rotor output of resolver 108 that generates the voltage cos $\bar{\theta}$ sin $\theta$ − sin $\theta$ cos $\theta$ cos $(\phi - \bar{\phi})$ is the only output that is utilized.

The resolver 109 receives the electrical equivalent of sin S sin $t$ from the resolver 108, through the resolver driver amplifier 185 and cos S sin $t$ from the resolver 107 through the resolver driver amplifier 184. If the rotor of the resolver 109 is rotated S' where $S' = S + \delta s$, then the outputs of said resolver can be written by:

$$E_1 = \sin t$$
$$E_2 = (\delta s) \sin t$$

where $\delta s \to 0$. Thus, the output $E_2$ is a measure of the error in the solution for S and can be used to drive the S motor and, therefore, solve for S.

To solve for $t$ the stator of the resolver 110 receives the same reference voltage that is inserted into the resolver 106. If the rotor of the resolver 110 is rotated to a new position $t'$ where $t' = t + \delta t$ and the sin $t'$ is substracted from the sin $t$ as generated in the resolver 109, the resultant is $\epsilon = \sin t - \sin t'$ where $\delta t \to 0$ then $$\epsilon = \delta t \cos t$$

Therefore the loop gain of the $t$ servo varies as cos $t$.

The $t$ set resistor 111 and the $t$ set switch 309 are utilized to set arbitrary tilt angles into the computer. The resistor 111 is adjusted until the $t$ dial 220 indicates the required angle.

The solution for $h$ is as follows:

H is inserted into the computer as a voltage analogue but it is desirable to have $h$ as a shaft rotation. Thus, $c$ is generated as a voltage by the variable resistor 113. Said generated voltage is impressed across the resistor 114 by the isolation amplifier 115. The values $ch$ that are generated, and the value H that is inserted into the computer at the terminal 216 are compared and the difference is used to drive the motor 116. However $\epsilon$ is related to the error in $h$ by the relation:

$$\delta h = \frac{\epsilon}{c}$$

Thus to keep the gain of the $h$ servo loop a constant, it is necessary to divide $\epsilon$ by $c$. Said division is performed by the resistors 120 and 121. Since this operation is performed upon the error signal it need not be accurate, however a range of about 100:1 is required.

The lens tilt $\alpha$ is determined by the Equation 4 shown above. The voltage $h$ that is generated by the resistance 122 is inserted into one rotor of the resolver 123 through the driver amplifier 124. If the rotor of said resolver 123 is positioned to the angle $\alpha$, as indicated by the dial 221 then $h \sin \alpha$ is generated on one of the rotor windings.

The difference voltage $\epsilon$ is used to drive the $\alpha$-servomotor 177. The servo loop gain can vary by 14:1.

The magnification is determined by Equation No. 5. The term $h \cos \alpha$ is generated by the resolver 123. The term $\sqrt{f^2 - F^2 \sin^2 t}$ is generated by means of the resolver servo consisting of the resolver 130, the motor 131 and the servo amplifier 132. The magnification Mo is generated as a shaft rotation by the motor 178 through the servo amplifier 174. $Mo\sqrt{f^2 - F^2 \sin^2 t}$ is taken from the resistor 133 that has $\sqrt{f^2 - F^2 \sin^2 t}$ impressed on it by the isolation amplifier 134. The Mo motor 178 is driven by the error E as given in the equation $$\epsilon = \delta Mo\sqrt{f^2 - F^2 \sin^2 t}$$

The value of X' as generated by the servo system consisting of servo amplifier 134, motor 135 and the resistor 136 is represented as a shaft position determining the reading of dial 222. The product FMo is generated at the potentiometer 137 with its movable contact rotated in Mo. The product FMo as represented by a valve at X' is generated as a shaft angle by the motor 135 and, in cooperation with the resistor 136 as a voltage.

The equations for the $d$ solution are shown as Equations 7 and 8. Equation 7 is indeterminate at $t=0$. Equation 8 indicates $d \rightarrow 0$ as $t \rightarrow 0$. The equation to be used for the solution of $d$ is controlled by the $t$ cam and switch 112 that controls contacts 300, 301 and 302.

The accurate solution of $d$ is:

$$d = \frac{f \cos t - \dfrac{h}{Mo}}{\sin t}$$

where $h$, as generated by the movable contact of the resistor 141 that is controlled by the motor 116, is placed across the resistance network consisting of the resistors 142 and 143 by the isolation amplifier 144. The resistance of 142 is proportional to Mo and the output voltage of the network $$\frac{h}{Mo}$$

is inserted into the servo amplifier 145. The positive and negative value of $\sin t$ is placed across the grounded center tapped potentiometer 146 by the isolation amplifiers 147 and 148. The output of an isolation amplifier is 180° out of phase with the input and the cascaded isolation amplifiers generate the required push-pull and potentiometer drive.

The other solution of $d$ is:

$$d = -\frac{1}{2}f \sin t\left[1 + \left(\frac{F}{h}\right)^2 - \left(\frac{F}{f}\right)^2\right]$$

The value $$\frac{F^2}{h^2}$$

is generated in the resistor divider network 149, 150 and 151.

$$\frac{F^2}{h^2}$$

is generated by dividing $$\frac{F^2}{h}$$

by $h$ in the resistance network 152, 153, 154. Value $$\left(1 - \frac{F^2}{h^2}\right)$$

is generated in the resistance divider network 155, 156 and 157. Value $$1 + \left(\frac{F}{h}\right)^2 - \left(\frac{F}{f}\right)^2$$

is multiplied by $f$ in the resistive network 158, 159 and 160 and the product A is inserted on the stator of the resolver 161. The rotor output of said resolver that generates $A \sin t$ is inserted into the servo amplifier 145 when the $t$ cam switch 112 is in the 0–10° solution range. Said $t$ cam switch also places the appropriate scale voltage on the resistor 146 and removes the $$\frac{h}{Mo}$$

input from the servo amplifier 145 by means of switches 301, 302, 303 and 304.

The swing S, lens tilt $\alpha$, rectifier focal length times magnification X' and lateral displacement $d$ appear as dial readings on the computer at 219, 221, 222 and 223. Said dial readings indicate directly the various settings for the Bausch and Lomb Autofocus Rectifier 69.

Said Bausch and Lomb Autofocus Rectifier 69 is a projection instrument for the accurate photo rectification of aerial negatives. Said rectifier is manually set in accordance with the dial readings that appear as the outputs of the computer. The resultant photograph is a rectified print that is corrected to the desired scale.

The present invention operates in the following manner. A plurality of aerial photographs are to be taken of some specific land area. The final prints are to be rectified and corrected as to scale and degree of tilt of the camera when the pictures were taken. At each instant that a photograph is taken, the roll, pitch and altitude of the camera, at the instant of exposure, is recorded on the film in the form of a discrete code that appears as light and dark spots or areas.

After the film is developed, said code is automatically scanned and decoded into a voltage that is proportional to the information recorded. Said voltage is inserted into the computer that solves various equations. A rectifier controller is set in accordance with the solution of the equations, as determined by the computer and indicated on the dials, and the final print is made. The final print is accurately rectified and corrected as to scale and tilt angle.

From the foregoing it will be obvious that the present invention may be subjected to various modifications without departing from the spirit of the invention.

The information that is recorded upon the film can represent any desired information such as the airplane air speed and direction and said recorded information can be recorded for purposes other than the rectification of photographs.

Another modification would be the incorporation of a servo means between the computer and the rectifier controller so that the various settings of said rectifier controller would be completely automatic.

Obviously many modifications and variations of the present invention are possible in the light of the above teachings. It is therefore to be understood that within the scope of the appended claims the invention may be practiced otherwise than as specifically described.

What is claimed is:

1. The method of rectifying aerial photographs comprising the steps of measuring the attitude of an aerial camera when a photograph is taken, converting said attitude information into a code comprising patterns of light and dark areas, recording said patterns on a film, decoding said patterns, converting the recorded patterns into a voltage, inserting said voltage into a computer for solving specific equations, and reading the solutions of the computations on dials for setting a photo-rectifier in accordance with said readings.

2. The method of rectifying aerial photographs comprising the steps of converting the deviation of a camera from the true vertical plane into a code, recording said coded information, decoding said coded information, converting such information into a voltage, and inserting said voltage into a computer for solving specific equations.

3. The method of rectifying aerial photographs comprising the steps of measuring the angles of tilt and the altitude of an aerial camera at the instant a photograph is taken, converting said information into a code consisting of patterns of light and dark areas, recording said patterns on a portion of the film containing the photograph, decoding said pattern, converting the recorded pattern into a voltage, and inserting said voltage into a computer for solving specific equations.

4. A photo-rectification device comprising aircraft attitude measuring means, a code wheel actuated by said means, a plurality of lamps illuminated selectively by said code wheel, a photographic film exposed to record the pattern of lamps illuminated, and means to scan and convert said pattern into a voltage proportional to such measured attitude.

5. A photo-rectification device comprising aircraft attitude measuring means, a code wheel actuated by said means, a plurality of lamps illuminated selectively by said code wheel, a photographic film exposed to record the pattern of lamps illuminated, light-sensitive means to scan said pattern, voltage generating means including a plurality of alternatively operable circuits each providing a discrete voltage, and a circuit-closing contact in each of said circuits actuated selectively by said light-sensitive means.

6. A photo-rectification device comprising a camera, an altimeter, a first code wheel coupled to said altimeter to convert the value measure to an analog thereof, gyro means to measure roll, a second code wheel coupled to said gyro to convert roll value to an analog thereof, gyro means to measure pitch, a third code wheel coupled to said gyro to convert pitch value to an analog thereof, a plurality of lamps illuminated selectively by said code wheels, a photographic film carried by said camera and exposed to record the pattern of lamps illuminated, light-sensitive means to scan said pattern, voltage generating means including a plurality of alternatively operable circuits each providing a discrete voltage, and a circuit-closing contact in each of said circuits actuated selectively by said light-sensitive means.

7. A photo-rectification device comprising a camera, an altimeter, a first code wheel coupled to said altimeter to convert the value measured to an analog thereof, gyro means to measure roll, a second code wheel coupled to said gyro to convert roll value to an analog thereof, gyro means to measure pitch, a third code wheel coupled to said gyro to convert pitch value to an analog thereof, a plurality of lamps illuminated selectively by said code wheels, a photographic film carried by said camera and exposed to record the pattern of lamps illuminated, light-sensitive means to scan said pattern, voltage generating means including a plurality of alternatively operable circuits each providing a discrete voltage, a circuit-closing contact in each of said circuits actuated selectively by said light-sensitive means, and computer means including inputs of said voltages to solve specific equations.

8. A photo-rectification device comprising a camera, an altimeter, a first code wheel coupled to said altimeter to convert the value measured to an analog thereof, gyro means to measure roll, a second code wheel coupled to said gyro to convert roll value to an analog thereof, gyro means to measure pitch, a third code wheel coupled to said gyro to convert pitch value to an analog thereof, a plurality of lamps illuminated selectively by said code wheels, a photographic film carried by said camera and exposed to record the pattern of lamps illuminated, light-sensitive means to scan said pattern, voltage generating means including a plurality of alternatively operable circuits each providing a discrete voltage, a circuit-closing contact in each of said circuits actuated selectively by said light-sensitive means, computer means comprising a plurality of inputs of said voltages to solve specific equations including resolution of swing, lens tilt, rectifier focal length times magnification and lateral displacement of said photo-rectifier, and indicating means adapted to present visually said solutions.

9. A photo-rectification device comprising photographic film exposing means, means to indicate the deviation of said film exposing means from a predetermined position, and a plurality of lamps actuated selectively by said indicating means to record an analog of the indicated deviation on such film.

10. A photo-rectification device comprising photographic film exposing means, means to indicate the deviation of said film exposing means from a plurality of base factors, a plurality of lamps actuated selectively by said indicating means to define an analog pattern of discrete light values, and means to record said values on such film.

References Cited in the file of this patent

UNITED STATES PATENTS

| | | |
|---|---|---|
| 1,626,787 | Corlett | May 3, 1927 |
| 2,047,070 | Horner | July 7, 1936 |
| 2,111,516 | Roux | Mar. 15, 1938 |
| 2,273,876 | Lutz et al. | Feb. 24, 1942 |
| 2,648,252 | Stancliff et al. | Aug. 11, 1953 |
| 2,702,499 | Dyer | Feb. 22, 1955 |

OTHER REFERENCES

Serial No. 256,012 (A. P. C.), filed Feb. 11, 1939, published May 4, 1953.